United States Patent
Shi et al.

(10) Patent No.: US 10,855,360 B2
(45) Date of Patent: Dec. 1, 2020

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/832,810

(22) Filed: Mar. 27, 2020

(65) Prior Publication Data

US 2020/0228187 A1 Jul. 16, 2020

Related U.S. Application Data

(63) Continuation of application No. PCT/CN2017/104781, filed on Sep. 30, 2017.

(51) Int. Cl.
*H04B 7/08* (2006.01)

(52) U.S. Cl.
CPC .................. *H04B 7/0805* (2013.01)

(58) Field of Classification Search
CPC .............. H04W 72/0406; H04B 7/0404; H04B 7/0689; H04B 7/0805
See application file for complete search history.

(56) References Cited

U.S. PATENT DOCUMENTS

| | | | |
|---|---|---|---|
| 2014/0334356 A1 | 11/2014 | Kim et al. | |
| 2019/0260533 A1* | 8/2019 | Manolakos | H04L 5/0048 |
| 2020/0052811 A1* | 2/2020 | Li | H04W 72/0446 |

FOREIGN PATENT DOCUMENTS

| | | |
|---|---|---|
| CN | 102202409 A | 9/2011 |
| CN | 102281642 A | 12/2011 |
| CN | 102595514 A | 7/2012 |
| CN | 105657833 A | 6/2016 |

OTHER PUBLICATIONS

International search report for PCT/CN2017/104781, dated May 31, 2018.

* cited by examiner

*Primary Examiner* — Sung S Ahn
(74) *Attorney, Agent, or Firm* — Perkins Coie LLP

(57) ABSTRACT

Embodiments of this application provide a wireless communications method and device, to enable frequency hopping to adapt to flexible transmission of a 5G system. The method includes: determining, by a network device, one of a time interval threshold for performing frequency hopping by a terminal during transmission of a first signal, a basic parameter set used by the terminal to transmit the first signal, or a configuration of a slot or a mini slot; and sending, by the network device, first information according to at least one of the time interval threshold, the basic parameter set, or the configuration of the slot or mini slot, where the first information is used to instruct the terminal to perform or not to perform frequency hopping during transmission of the first signal.

19 Claims, 4 Drawing Sheets

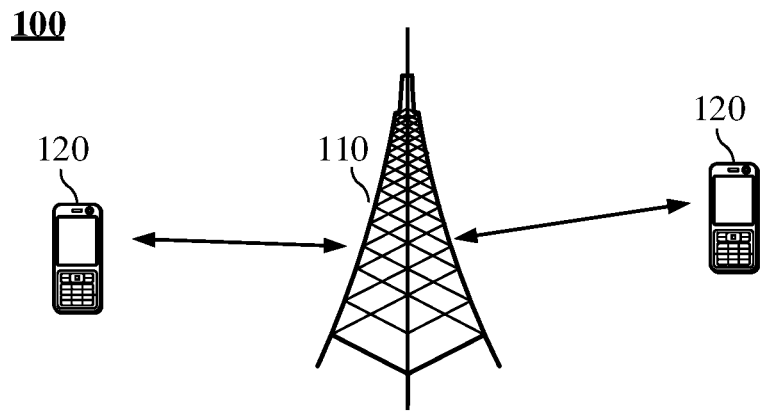

210 — A network device determines one of a time interval threshold for performing frequency hopping by a terminal during transmission of a first signal, a basic parameter set used by the terminal to transmit the first signal, or a configuration of a slot or a mini slot 220 — The network device sends first information according to at least one of the time interval threshold, the basic parameter set, or the configuration of the slot or mini slot, where the first information is used to instruct the terminal to perform or not to perform frequency hopping during transmission of the first signal

310 — A terminal receives first information sent by a network device, where the first information is used to instruct the terminal to perform frequency hopping during transmission of a first signal 320 — The terminal determines, in response to the first information, whether to perform frequency hopping during transmission of the first signal

FIG. 3

WIRELESS COMMUNICATION METHOD AND DEVICE

CROSS-REFERENCE TO RELATED APPLICATION

This is a continuation application of International PCT Application No. PCT/CN2017/104781, having an international filing date of Sep. 30, 2017, the entire content of which is hereby incorporated by reference.

BACKGROUND

Technical Field

This application relates to the communications field, and more specifically, to a wireless communications method and device.

Related Art

In a Long Term Evolution (Long Term Evolution, LTE) system, a network device performs frequency hopping when configuring that a terminal performs physical uplink shared channel (Physical Uplink Shared Channel, PUSCH) transmission or sounding reference signal (Sounding Reference Signal, SRS) transmission, and the terminal performs frequency hopping during PUSCH or SRS transmission.

In a 5G system, communication transmission is highly flexible.

How to enable frequency hopping to adapt to flexible transmission of a 5G system is a problem that urgently needs to be resolved.

SUMMARY

Embodiments of this application provide a wireless communications method and device, to enable frequency hopping to adapt to flexible transmission of a 5G system.

A first aspect provides a wireless communications method, including:

determining, by a network device, one of a time interval threshold for performing frequency hopping by a terminal during transmission of a first signal, a basic parameter set used by the terminal to transmit the first signal, or a configuration of a slot or a mini slot; and sending, by the network device, first information according to at least one of the time interval threshold, the basic parameter set, or the configuration of the slot or mini slot, where the first information is used to instruct the terminal to perform or not to perform frequency hopping during transmission of the first signal.

Therefore, in this embodiment of this application, a network device sends, according to one of a time interval threshold for performing frequency hopping by a terminal during transmission of a first signal, a basic parameter set used by the terminal to transmit the first signal, or a configuration of a slot or a mini slot, first information for instructing the terminal to perform or not to perform frequency hopping during transmission of the first signal, so that it may be chosen, according to a current communication scenario, to perform or not to perform frequency hopping, to enable a frequency hopping technology to adapt to flexible transmission of a 5G system.

With reference to the first aspect, in a possible implementation of the first aspect, the sending, by the network device, first information according to at least one of the time interval threshold, the basic parameter set, or the configuration of the slot or mini slot includes:

sending the first information according to a subcarrier spacing and/or a symbol length included in the basic parameter set.

With reference to the first aspect or any possible implementation in the foregoing, in another possible implementation of the first aspect, the sending the first information according to a subcarrier spacing and/or a symbol length included in the basic parameter set includes:

when the subcarrier spacing is greater than or equal to a first threshold and/or the symbol length is less than or equal to a second threshold, sending the first information, where the first information is used to instruct not to perform frequency hopping.

With reference to the first aspect or any possible implementation in the foregoing, in another possible implementation of the first aspect, the sending the first information according to a subcarrier spacing and/or a symbol length included in the basic parameter set includes:

when the subcarrier spacing is less than a first threshold and/or the symbol length is greater than a second threshold, sending the first information, where the first information is used to instruct to perform frequency hopping.

With reference to the first aspect or any possible implementation in the foregoing, in another possible implementation of the first aspect, the sending, by the network device, first information according to at least one of the time interval threshold, the basic parameter set, or the configuration of the slot or mini slot includes:

when the length of the slot or mini slot is greater than or equal to a third threshold, sending the first information, where the first information is used to instruct to perform frequency hopping.

With reference to the first aspect or any possible implementation in the foregoing, in another possible implementation of the first aspect, the sending, by the network device, first information according to at least one of the time interval threshold, the basic parameter set, or the configuration of the slot or mini slot includes:

when the length of the slot or mini slot is less than a third threshold, sending the first information, where the first information is used to instruct not to perform frequency hopping.

With reference to the first aspect or any possible implementation in the foregoing, in another possible implementation of the first aspect, the sending, by the network device, first information according to at least one of the time interval threshold, the basic parameter set, or the configuration of the slot or mini slot includes:

when a first time length is less than or equal to the time interval threshold, sending the first information, where the first information is used to instruct not to perform frequency hopping, and the first time length is a signal transmission time length before a frequency hopping time node or a signal transmission time length after a frequency hopping time node or a sum of signal transmission time lengths before and after a frequency hopping time node.

With reference to the first aspect or any possible implementation in the foregoing, in another possible implementation of the first aspect, the sending, by the network device, first information according to at least one of the time interval threshold, the basic parameter set, or the configuration of the slot or mini slot includes:

when a first time length is greater than the time interval threshold, sending the first information, where the first information is used to instruct to perform frequency hopping, and the first time length is a signal transmission time length before a frequency hopping time node or a signal transmission time length after a frequency hopping time node or a sum of signal transmission time lengths before and after a frequency hopping time node.

With reference to the first aspect or any possible implementation in the foregoing, in another possible implementation of the first aspect, the determining, by a network device, a time interval threshold for performing frequency hopping by a terminal during transmission of a first signal includes:

selecting, by the network device, the time interval threshold from a time interval threshold set.

With reference to the first aspect or any possible implementation in the foregoing, in another possible implementation of the first aspect, the selecting, by the network device, the time interval threshold from a time interval threshold set includes:

selecting the time interval threshold from the time interval threshold set according to the basic parameter set used by the terminal to transmit the first signal.

With reference to the first aspect or any possible implementation in the foregoing, in another possible implementation of the first aspect, the method further includes:

receiving, by the network device, second information sent by the terminal, where the second information is used to indicate the time interval threshold.

With reference to the first aspect or any possible implementation in the foregoing, in another possible implementation of the first aspect, the first signal is a physical uplink shared channel PUSCH or a sounding reference signal SRS.

A second aspect provides a wireless communications method, including:

receiving, by a terminal, first information sent by a network device, where the first information is used to instruct the terminal to perform frequency hopping during transmission of a first signal; and determining, by the terminal in response to the first information, whether to perform frequency hopping during transmission of the first signal.

Therefore, in this embodiment of this application, after receiving first information that is sent by a network device and is used to instruct the terminal to perform frequency hopping during transmission of a first signal, a terminal may determine whether to perform frequency hopping during transmission of the first signal instead of being required to perform frequency hopping, so that it may be chosen, according to a current communication scenario, to perform or not to perform frequency hopping, to enable a frequency hopping technology to adapt to flexible transmission of a 5G system.

With reference to the second aspect, in a possible implementation of the second aspect, the determining, by the terminal, whether to perform frequency hopping during transmission of the first signal includes:

determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal.

With reference to the second aspect or any possible implementation in the foregoing of the second aspect, in another possible implementation of the second aspect, the determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal includes:

determining, by the terminal according to a subcarrier spacing and/or a symbol length included in the basic parameter set, whether to perform frequency hopping during transmission of the first signal.

With reference to the second aspect or any possible implementation in the foregoing of the second aspect, in another possible implementation of the second aspect, the determining, by the terminal according to a subcarrier spacing and/or a symbol length included in the basic parameter set, whether to perform frequency hopping during transmission of the first signal includes:

when the subcarrier spacing is greater than or equal to a first threshold and/or the symbol length is less than or equal to a second threshold, determining, by the terminal, not to perform frequency hopping during transmission of the first signal; or when the subcarrier spacing is less than a first threshold and/or the symbol length is greater than a second threshold, determining, by the terminal, to perform frequency hopping during transmission of the first signal.

With reference to the second aspect or any possible implementation in the foregoing of the second aspect, in another possible implementation of the second aspect, the determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal includes:

when the length of the slot or mini slot is greater than or equal to a third threshold, determining, by the terminal, to perform frequency hopping during transmission of the first signal.

With reference to the second aspect or any possible implementation in the foregoing of the second aspect, in another possible implementation of the second aspect, the determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal includes:

when the length of the slot or mini slot is less than a third threshold, determining, by the terminal, not to perform frequency hopping during transmission of the first signal.

With reference to the second aspect or any possible implementation in the foregoing of the second aspect, in another possible implementation of the second aspect, the determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal includes:

when a first time length is less than or equal to the time interval threshold, determining, by the terminal, not to perform frequency hopping during transmission of the first signal, where the first time length is a signal transmission time length before a frequency hopping time node or a signal transmission time length after a frequency hopping time node or a sum of signal transmission time lengths before and after a frequency hopping time node.

With reference to the second aspect or any possible implementation in the foregoing of the second aspect, in another possible implementation of the second aspect, the determining, by the terminal according to one of a time interval threshold for performing frequency hopping during transmission of the first signal, a basic parameter set used by the terminal to transmit the first signal, or a configuration of a slot or a mini slot, whether to perform frequency hopping during transmission of the first signal includes:

when a first time length is greater than the time interval threshold, determining, by the terminal, to perform frequency hopping during transmission of the first signal, where the first time length is a signal transmission time length before a frequency hopping time node or a signal transmission time length after a frequency hopping time node or a sum of signal transmission time lengths before and after a frequency hopping time node.

With reference to the second aspect or any possible implementation in the foregoing of the second aspect, in another possible implementation of the second aspect, the terminal sends second information to the network device, where the second information is used to indicate the time interval threshold.

With reference to the second aspect or any possible implementation in the foregoing of the second aspect, in another possible implementation of the second aspect, the first signal is a physical uplink shared channel PUSCH or a sounding reference signal SRS.

A third aspect provides a wireless communications method, including:

determining, by a network device, at least one of a time interval threshold for switching an uplink transmit antenna by a terminal, a basic parameter set used when the terminal uses the uplink transmit antenna to send a signal, or a configuration of a slot or a mini slot; and sending, by the network device, first information according to the at least one of the time interval threshold, the basic parameter set, or the configuration of the slot or mini slot to instruct the terminal to switch or not to switch the uplink transmit antenna.

Therefore, in this embodiment of this application, the network device sends, according to at least one of a time interval threshold for switching an uplink transmit antenna by a terminal, a basic parameter set used when the terminal uses the uplink transmit antenna to send a signal, or a configuration of a slot or a mini slot, first information used to instruct the terminal to switch or not to switch the uplink transmit antenna, so that it may be chosen, according to a current communication scenario, to switch or not to switch an antenna to enable an antenna switching aspect to adapt to flexible transmission of a 5G system.

With reference to the third aspect, in a possible implementation of the third aspect, the sending, by the network device, first information according to at least one of the time interval threshold, the basic parameter set, or the configuration of the slot or mini slot to instruct the terminal to switch or not to switch the uplink transmit antenna includes:

sending the first information according to a subcarrier spacing and/or a symbol length included in the basic parameter set.

With reference to the third aspect or any possible implementation in the foregoing of the third aspect, in another possible implementation of the third aspect, the sending the first information according to a subcarrier spacing and/or a symbol length included in the basic parameter set includes:

when the subcarrier spacing is greater than or equal to a first threshold and/or the symbol length is less than or equal to a second threshold, sending the first information, where the first information is used to instruct not to switch the uplink transmit antenna.

With reference to the third aspect or any possible implementation in the foregoing of the third aspect, in another possible implementation of the third aspect, the sending the first information according to a subcarrier spacing and/or a symbol length included in the basic parameter set includes:

when the subcarrier spacing is less than a first threshold and/or the symbol length is greater than a second threshold, sending the first information, where the first information is used to instruct to switch the uplink transmit antenna.

With reference to the third aspect or any possible implementation in the foregoing of the third aspect, in another possible implementation of the third aspect, the sending, by the network device, first information according to at least one of the time interval threshold, the basic parameter set, or the configuration of the slot or mini slot to instruct the terminal to switch or not to switch the uplink transmit antenna includes:

when the length of the slot or mini slot is greater than or equal to a third threshold, sending, by the network device, the first information, where the first information is used to instruct to switch the uplink transmit antenna.

With reference to the third aspect or any possible implementation in the foregoing of the third aspect, in another possible implementation of the third aspect, the sending, by the network device, first information according to at least one of the time interval threshold, the basic parameter set, or the configuration of the slot or mini slot to instruct the terminal to switch or not to switch the uplink transmit antenna includes:

when the length of the slot or mini slot is less than a third threshold, sending, by the network device, the first information, where the first information is used to instruct not to switch the uplink transmit antenna.

With reference to the third aspect or any possible implementation in the foregoing of the third aspect, in another possible implementation of the third aspect, the sending, by the network device, first information according to at least one of the time interval threshold, the basic parameter set, or the configuration of the slot or mini slot to instruct the terminal to switch or not to switch the uplink transmit antenna includes:

when a first time length is greater than or equal to the time interval threshold, sending the first information, where the first information is used to instruct to switch the uplink transmit antenna, and the first time length is equal to a time length before a switching time node, a time length after a switching time node or a sum of time lengths before and after a switching time node.

With reference to the third aspect or any possible implementation in the foregoing of the third aspect, in another possible implementation of the third aspect, the sending, by the network device, first information according to at least one of the time interval threshold, the basic parameter set, or the configuration of the slot or mini slot to instruct the terminal to switch or not to switch the uplink transmit antenna includes:

when a first time length is less than the time interval threshold, sending the first information, where the first information is used to instruct not to switch the uplink transmit antenna, and the first time length is equal to a time length before a switching time node, a time length after a switching time node or a sum of time lengths before and after a switching time node.

With reference to the third aspect or any possible implementation in the foregoing of the third aspect, in another possible implementation of the third aspect, the determining, by a network device, a time interval threshold for switching an uplink transmit antenna by a terminal includes:

selecting, by the network device, the time interval threshold from a time interval threshold set.

With reference to the third aspect or any possible implementation in the foregoing of the third aspect, in another possible implementation of the third aspect, the selecting, by the network device, the time interval threshold from a time interval threshold set includes: selecting the time interval threshold from the time interval threshold set according to the basic parameter set used when the terminal uses the uplink transmit antenna to send a signal.

With reference to the third aspect or any possible implementation in the foregoing of the third aspect, in another possible implementation of the third aspect, the method further includes:

receiving, by the network device, second information sent by the terminal, where the second information is used to indicate the time interval threshold.

A fourth aspect provides a wireless communications method, including:

receiving, by a terminal, first information sent by a network device, where the first information is used to instruct the terminal to switch an uplink transmit antenna; and determining, by the terminal in response to the first information, whether to switch the uplink transmit antenna.

Therefore, in this embodiment of this application, after receiving first information that is sent by a network device and is used to instruct the terminal to switch an antenna, a terminal may determine whether to switch an uplink antenna during uplink signal transmission instead of being required to switch an antenna, so that it may be chosen, according to a current communication scenario, to switch or not to switch an antenna to enable an antenna switching aspect to adapt to flexible transmission of a 5G system.

With reference to the fourth aspect, in a possible implementation of the fourth aspect, the determining, by the terminal, whether to switch the uplink transmit antenna includes:

determining, by the terminal according to at least one of a time interval threshold for switching the uplink transmit antenna, a basic parameter set used when the terminal uses the uplink transmit antenna to send a signal, or a configuration of a slot or a mini slot, whether to switch the uplink transmit antenna.

With reference to the fourth aspect or any possible implementation in the foregoing of the fourth aspect, in another possible implementation of the fourth aspect, the determining, by the terminal according to at least one of a time interval threshold for switching the uplink transmit antenna, a basic parameter set used when the terminal uses the uplink transmit antenna to send a signal, or a configuration of a slot or a mini slot, whether to switch the uplink transmit antenna includes:

determining, according to a subcarrier spacing and/or a symbol length included in the basic parameter set, whether to switch the uplink transmit antenna.

With reference to the fourth aspect or any possible implementation in the foregoing of the fourth aspect, in another possible implementation of the fourth aspect, the determining, according to a subcarrier spacing and/or a symbol length included in the basic parameter set, whether to switch the uplink transmit antenna includes:

when the subcarrier spacing is greater than or equal to a first threshold and/or the symbol length is less than or equal to a second threshold, determining not to switch the uplink transmit antenna; or when the subcarrier spacing is less than a first threshold and/or the symbol length is greater than a second threshold, determining to switch the uplink transmit antenna.

With reference to the fourth aspect or any possible implementation in the foregoing of the fourth aspect, in another possible implementation of the fourth aspect, the determining, by the terminal according to at least one of a time interval threshold for switching the uplink transmit antenna, a basic parameter set used when the terminal uses the uplink transmit antenna to send a signal, or a configuration of a slot or a mini slot, whether to switch the uplink transmit antenna includes:

when the length of the slot or mini slot is greater than or equal to a third threshold, sending, by the network device, the first information, and determining, by the terminal, to switch the uplink transmit antenna.

With reference to the fourth aspect or any possible implementation in the foregoing of the fourth aspect, in another possible implementation of the fourth aspect, the determining, by the terminal according to at least one of a time interval threshold for switching the uplink transmit antenna, a basic parameter set used when the terminal uses the uplink transmit antenna to send a signal, or a configuration of a slot or a mini slot, whether to switch the uplink transmit antenna includes:

when the length of the slot or mini slot is less than a third threshold, determining, by the terminal, not to switch the uplink transmit antenna.

With reference to the fourth aspect or any possible implementation in the foregoing of the fourth aspect, in another possible implementation of the fourth aspect, the determining, by the terminal according to at least one of a time interval threshold for switching the uplink transmit antenna, a basic parameter set used when the terminal uses the uplink transmit antenna to send a signal, or a configuration of a slot or a mini slot, whether to switch the uplink transmit antenna includes:

when a first time length is greater than or equal to the time interval threshold, determining to switch the uplink transmit antenna; or when a first time length is less than the time interval threshold, determining not to switch the uplink transmit antenna, where the first time length is equal to a time length before a switching time node, a time length after a switching time node or a sum of time lengths before and after a switching time node.

With reference to the fourth aspect or any possible implementation in the foregoing of the fourth aspect, in another possible implementation of the fourth aspect, the method further includes:

sending, by the terminal, second information to the network device, where the second information is used to indicate the time interval threshold.

A fifth aspect provides a network device, configured to perform the foregoing method in the first aspect or any possible implementation of the first aspect or the third aspect or any possible implementation of the third aspect. Specifically, the network device includes functional modules configured to perform the foregoing method in the first aspect or any possible implementation of the first aspect or the third aspect or any possible implementation of the third aspect.

A sixth aspect provides a terminal, configured to perform the foregoing method in the second aspect or any possible implementation of the second aspect or the fourth aspect or any possible implementation of the fourth aspect. Specifically, the terminal includes functional modules configured to perform the foregoing method in the second aspect or any possible implementation of the second aspect or the fourth aspect or any possible implementation of the fourth aspect.

A seventh aspect provides a network device, including a processor, a memory, and a transceiver. The processor, the memory, and the transceiver communicate with each other through internal connection channels to transfer control and/or data signals, to enable the network device to perform the foregoing method in the first aspect or any possible implementation of the first aspect or the third aspect or any possible implementation of the third aspect.

An eighth aspect provides a terminal, including a processor, a memory, and a transceiver. The processor, the memory, and the transceiver communicate with each other through internal connection channels to transfer control and/or data signals, to enable the terminal to perform the foregoing method in the second aspect or any possible implementation of the second aspect or the fourth aspect or any possible implementation of the fourth aspect.

A ninth aspect provides a computer readable medium, configured to store a computer program, the computer program including an instruction used to perform any method in the foregoing or the method in any possible implementation.

A tenth aspect provides a computer program product including an instruction, where the instruction enables, when being executed on the computer, the computer to perform any method in the foregoing or the method in any possible implementation.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

FIG. 1 is a schematic diagram of a wireless communications system according to an embodiment of this application.

FIG. 2 is a schematic flowchart of a wireless communications method according to an embodiment of this application.

FIG. 3 is a schematic flowchart of a wireless communications method according to an embodiment of this application.

DETAILED DESCRIPTION

Figure 4:
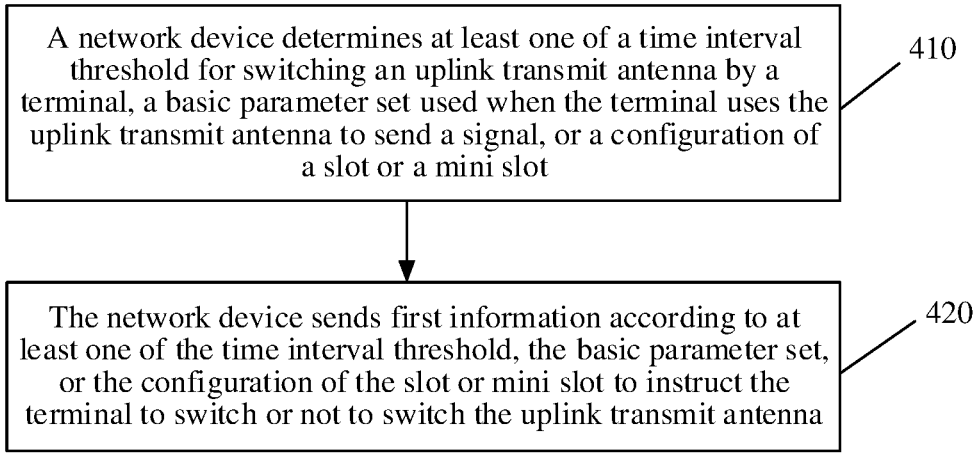
FIG. 4 is a schematic flowchart of a wireless communications method according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile Communications (Global System for Mobile communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a future 5G system or the like.

FIG. 1 shows a wireless communications system 100 according to an embodiment of this application. As shown in FIG. 1, the wireless communications system 100 may include a network device 110. The network device 110 may be a device communicating with a terminal device. The network device 100 may provide communication coverage for a specific geographic area, and may communicate with a terminal device (for example, UE) located within the area with coverage. Optionally, the network device 100 may be a base transceiver station (Base Transceiver Station, BTS) in a GSM system or a CDMA system, may be a NodeB (NodeB, NB) in a WCDMA system, or may be an evolutional Node B (Evolutional Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage range of the network device 110. The terminal device 120 may be mobile or fixed. Optionally, the terminal device 120 may be an access terminal, user equipment (User Equipment, UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a future evolved PLMN, or the like.

Optionally, the terminal device 120 may perform device to device (D2D) communication.

Optionally, a 5G system or network may be further referred to as a new radio (New Radio, NR) system or network.

FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller and a mobility management entity. This is not limited in this embodiment of this application.

It should be understood that terms "system" and "network" in this specification are usually interchangeably used in this specification. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

FIG. 2 is a schematic flowchart of a wireless communications method 200 according to an embodiment of this application. The method 200 may be optionally applied to the system shown in FIG. 1, but is not limited thereto. The method 200 includes at least some of the following content.

210. A network device determines one of a time interval threshold for performing frequency hopping by a terminal during transmission of a first signal, a basic parameter set used by the terminal to transmit the first signal, or a configuration of a slot or a mini slot.

Optionally, the first signal is a PUSCH or an SRS. Certainly, the first signal may be another signal. This is not specially limited in this embodiment of this application.

Optionally, the time interval threshold for performing frequency hopping by the terminal during transmission of the first signal may be a specific value. When a particular condition is met, for example, a signal transmission time is greater than the value, the terminal performs frequency hopping, or when the signal transmission time is less than or equal to the value, the terminal does not perform frequency hopping.

Optionally, a basic parameter set used by the terminal to transmit the first signal may include at least one of a subcarrier spacing, a symbol length, or a cyclic prefix (Cyclic Prefix, CP).

Optionally, the CP in the basic parameter set mentioned in this embodiment of this application may be a normal (Normal) CP.

Optionally, the configuration of the slot or mini slot mentioned in this embodiment of this application is the configuration of the slot or mini slot during transmission of the first signal.

Optionally, the configuration of the slot or mini slot mentioned in this embodiment of this application may be the length of the slot or mini slot. If the slot or mini slot includes a fixed quantity of symbols, the configuration may also be reflected by using the length of symbols.

220. The network device sends first information according to at least one of the time interval threshold, the basic parameter set, or the configuration of the slot or mini slot, where the first information is used to instruct the terminal to perform or not to perform frequency hopping during transmission of the first signal.

Optionally, that the network device sends first information according to at least one of the time interval threshold, the basic parameter set, or the configuration of the slot or mini slot, where the first information is used to instruct the terminal to perform or not to perform frequency hopping during transmission of the first signal may have the following implementations:

1) When it is determined, according to at least one of the time interval threshold, the basic parameter set, or the configuration of the slot or mini slot, that the terminal needs to perform frequency hopping during transmission of the first signal, the first information may be sent to instruct to perform frequency hopping; and when it is determined, according to at least one of the time interval threshold, the basic parameter set, or the configuration of the slot or mini slot, that the terminal does not need to perform frequency hopping during transmission of the first signal, the first information may be sent to instruct not to perform frequency hopping.

2) When it is determined, according to at least one of the time interval threshold, the basic parameter set, or the configuration of the slot or mini slot, that the terminal needs to perform frequency hopping during transmission of the first signal, the first information may be sent to instruct to perform frequency hopping; and when it is determined, according to at least one of the time interval threshold, the basic parameter set, or the configuration of the slot or mini slot, that the terminal does not need to perform frequency hopping during transmission of the first signal, information is not sent.

3) When it is determined, according to at least one of the time interval threshold, the basic parameter set, or the configuration of the slot or mini slot, that the terminal needs to perform frequency hopping during transmission of the first signal, information is not sent; and when it is determined, according to at least one of the time interval threshold, the basic parameter set, or the configuration of the slot or mini slot, that the terminal does not need to perform frequency hopping during transmission of the first signal, the first information may be sent to instruct not to perform frequency hopping.

For clearer understanding of this application, several manners of sending the first information according to at least one of the time interval threshold, the basic parameter set, or the configuration of the slot or mini slot are described below.

Optionally, the network device sends the first information according to a subcarrier spacing and/or a symbol length included in the basic parameter set.

Optionally, when the subcarrier spacing is greater than or equal to a first threshold and/or the symbol length is less than or equal to a second threshold, the first information is sent, where the first information is used to instruct not to perform frequency hopping. If the subcarrier spacing is less than a first threshold, and/or the symbol length is greater than a second threshold, information may be not sent, or the first information may be sent, where the first information is used to instruct to perform frequency hopping.

Optionally, when the subcarrier spacing is less than a first threshold and/or the symbol length is greater than a second threshold, the first information is sent, where the first information is used to instruct to perform frequency hopping. If the subcarrier spacing is greater than or equal to a first threshold and/or the symbol length is less than or equal to a second threshold, information may be not sent, or the first information may be sent, where the first information is used to instruct not to perform frequency hopping.

Optionally, when the length of the slot or mini slot is greater than or equal to a third threshold, the first information is sent, where the first information is used to instruct to perform frequency hopping. If the length of the slot or mini slot is less than a third threshold, information may be not sent, or the first information is sent to instruct not to perform frequency hopping.

Optionally, when the length of the slot or mini slot is less than a third threshold, the first information is sent, where the first information is used to instruct not to perform frequency hopping. If the length of the slot or mini slot is greater than or equal to a third threshold, information may be not sent, or the first information is sent to instruct to perform frequency hopping.

Optionally, when a first time length is less than or equal to the time interval threshold, the first information is sent, where the first information is used to instruct not to perform frequency hopping, and the first time length is a signal transmission time length before a frequency hopping time node or a signal transmission time length after a frequency hopping time node or a sum of signal transmission time lengths before and after a frequency hopping time node. If the first time length is greater than the time interval threshold, information may be not sent, or the first information is sent to instruct to perform frequency hopping.

Optionally, the frequency hopping time node mentioned in this embodiment of this application may be a preset time node or a time node configured by the network device for the terminal. That is, when a particular condition is met, frequency hopping may be performed at the time node.

Optionally, the signal transmission time length before a frequency hopping time node may be a length from the frequency hopping time node to a fixed time point, or a time length from the frequency hopping time node to a starting point of a current signal transmission, or a continuous time length of a fixed frequency used before the frequency hopping time node.

Optionally, the signal transmission time length after a frequency hopping time node may be a length from the frequency hopping time node to a fixed time point, or a time length from the frequency hopping time node to an end point of a current signal transmission, or a continuous time length of a fixed frequency used after the frequency hopping time node.

Optionally, when a first time length is greater than the time interval threshold, the first information is sent, where the first information is used to instruct to perform frequency hopping, and the first time length is a signal transmission time length before a frequency hopping time node or a signal transmission time length after a frequency hopping time node or a sum of signal transmission time lengths before and after a frequency hopping time node. If the first time length is less than or equal to the time interval threshold, information may be not sent, or the first information is sent to instruct not to perform frequency hopping.

Optionally, the network device selects the time interval threshold from a time interval threshold set.

Optionally, the time interval threshold is selected from the time interval threshold set according to the basic parameter set used by the terminal to transmit the first signal.

Specifically, the network device may select the time interval threshold from the time interval threshold according to the subcarrier spacing and/or the symbol length used when the terminal transmits the first signal.

Optionally, each subcarrier spacing and/or the symbol length may correspond to a respective time interval threshold, and the time interval threshold may be negatively correlated to the subcarrier spacing and positively correlated to the symbol length.

Optionally, the network device receives second information sent by the terminal, where the second information is used to indicate the time interval threshold.

Specifically, the terminal may indicate, to the network device, a time interval threshold that can be supported by the terminal, and the time interval threshold may be correlated to a capability of the terminal or correlated to the basic parameter set.

Therefore, in this embodiment of this application, the network device send, according to at least one of a time interval threshold for performing frequency hopping by a terminal during transmission of a first signal, a basic parameter set used by the terminal to transmit the first signal, or a configuration of a slot or a mini slot, first information for instructing the terminal to perform or not to perform frequency hopping during transmission of the first signal, so that it may be chosen, according to a current communication scenario, to perform or not to perform frequency hopping, to enable a frequency hopping technology to adapt to flexible transmission of a 5G system.

FIG. 3 is a schematic flowchart of a wireless communications method 300 according to an embodiment of this application. The method 300 includes at least some of the following content.

310. The terminal receives first information sent by a network device, where the first information is used to instruct the terminal to perform frequency hopping during transmission of a first signal.

320. The terminal determines, in response to the first information, whether to perform frequency hopping during transmission of the first signal.

Optionally, the terminal determines, according to one of a time interval threshold for performing frequency hopping during transmission of the first signal, a basic parameter set used by the terminal to transmit the first signal, or a configuration of a slot or a mini slot, whether to perform frequency hopping during transmission of the first signal.

Optionally, the terminal determines according to a subcarrier spacing and/or a symbol length included in the basic parameter set, whether to perform frequency hopping during transmission of the first signal.

In an implementation, when the subcarrier spacing is greater than or equal to a first threshold and/or the symbol length is less than or equal to a second threshold, the terminal determines not to perform frequency hopping during transmission of the first signal.

In an implementation, when the subcarrier spacing is less than a first threshold and/or the symbol length is greater than a second threshold, the terminal determines to perform frequency hopping during transmission of the first signal.

Optionally, when the length of the slot or mini slot is greater than or equal to a third threshold, the terminal determines to perform frequency hopping during transmission of the first signal.

Optionally, when the length of the slot or mini slot is less than a third threshold, the terminal determines not to perform frequency hopping during transmission of the first signal.

Optionally, when a first time length is less than or equal to the time interval threshold, the terminal determines not to perform frequency hopping during transmission of the first signal, where the first time length is a signal transmission time length before a frequency hopping time node or a signal transmission time length after a frequency hopping time node or a sum of signal transmission time lengths before and after a frequency hopping time node.

Optionally, when a first time length is greater than the time interval threshold, the terminal determines to perform frequency hopping during transmission of the first signal, where the first time length is a signal transmission time length before a frequency hopping time node or a signal transmission time length after a frequency hopping time node or a sum of signal transmission time lengths before and after a frequency hopping time node.

Optionally, the terminal sends second information to the network device, where the second information is used to indicate the time interval threshold.

Specifically, the terminal may indicate, to the network device, a time interval threshold that can be used by the terminal, and the time interval threshold may be correlated to a capability of the terminal or correlated to the basic parameter set.

It should be understood that some descriptions in the method 200, for example, the explanations of terms, the manner of determining whether the terminal needs to perform frequency hopping, and the like, may be applicable to the method 300. For brevity, details are not described herein again.

Therefore, in this embodiment of this application, after receiving first information that is sent by a network device and is used to instruct the terminal to perform frequency hopping during transmission of a first signal, a terminal may determine whether to perform frequency hopping during transmission of the first signal instead of being required to perform frequency hopping, so that it may be chosen, according to a current communication scenario, to perform or not to perform frequency hopping, to enable a frequency hopping technology to adapt to flexible transmission of a 5G system.

It should be understood that in the description of the method 300, the terminal determines, after receiving information used to instruct the terminal to perform frequency hopping, whether to perform frequency hopping. In this embodiment of this application, the terminal may also determine, after receiving information used to instruct the terminal not to perform frequency hopping, whether to perform frequency hopping. For a specific determining manner, refer to the description of the method 300. For brevity, details are not described herein again.

In a communications system, the network device may send a plurality of downlink channels to the terminal simultaneously. The terminal may use a plurality of receive antennas to perform simultaneous reception. However, if the quantity of transmit power amplifiers of the terminal is less than the quantity of receive antennas, the terminal cannot send simultaneously uplink channels whose quantity is the same as that of the downlink channels. In this case, if uplink and downlink reciprocity needs to be implemented, a transmit antenna needs to be switched. How to switch a transmit antenna of a terminal is described below respectively on a network side and a terminal side with reference to the methods 400 and 500 shown in FIG. 4 and FIG. 5. However, it should be understood that the methods 400 and 500 in this embodiment of this application are not limited to the aforementioned scenarios.

FIG. 4 is a schematic flowchart of a wireless communications method 400 according to an embodiment of this application. The method 400 includes at least some of the following content.

410. A network device determines at least one of a time interval threshold for switching an uplink transmit antenna by a terminal, a basic parameter set used when the terminal uses the uplink transmit antenna to send a signal, or a configuration of a slot or a mini slot.

420. The network device sends first information according to the at least one of the time interval threshold, the basic parameter set, or the configuration of the slot or mini slot to instruct the terminal to switch or not to switch the uplink transmit antenna.

Optionally, that a network device sends first information according to at least one of a time interval threshold for switching an uplink transmit antenna by a terminal, a basic parameter set used when the terminal uses the uplink transmit antenna to send a signal, or a configuration of a slot or a mini slot, where the first information is used to instruct the terminal to switch or not to switch the uplink transmit antenna may have the following implementations:

1) When it is determined, according to at least one of the time interval threshold, the basic parameter set, or the configuration of the slot or mini slot, that the terminal needs to switch the uplink transmit antenna, the first information may be sent to instruct to perform switching; and when it is determined, according to at least one of the time interval threshold, the basic parameter set, or the configuration of the slot or mini slot, that the terminal does need to switch the uplink transmit antenna, the first information may be sent to instruct not to perform switching.

2) When it is determined, according to at least one of the time interval threshold, the basic parameter set, or the configuration of the slot or mini slot, that the terminal needs to switch the uplink transmit antenna, the first information may be sent to instruct to perform switching; and when it is determined, according to at least one of the time interval threshold, the basic parameter set, or the configuration of the slot or mini slot, that the terminal does need to switch the uplink transmit antenna, information is not sent.

3) When it is determined, according to at least one of the time interval threshold, the basic parameter set, or the configuration of the slot or mini slot, that the terminal needs to switch the uplink transmit antenna, information is not sent; and when it is determined, according to at least one of the time interval threshold, the basic parameter set, or the configuration of the slot or mini slot, that the terminal does need to switch the uplink transmit antenna, the first information may be sent to instruct not to perform switching.

For clearer understanding of this application, several manners of sending the first information according to at least one of the time interval threshold, the basic parameter set, or the configuration of the slot or mini slot are described below.

Optionally, the first information is sent according to a subcarrier spacing and/or a symbol length included in the basic parameter set.

Optionally, when the subcarrier spacing is greater than or equal to a first threshold and/or the symbol length is less than or equal to a second threshold, the first information is sent, where the first information is used to instruct not to switch the uplink transmit antenna. If the subcarrier spacing is less than a first threshold and/or the symbol length is greater than a second threshold, information may be not sent, or the first information may be sent, where the first information is used to instruct to perform switching.

Optionally, when the subcarrier spacing is less than a first threshold and/or the symbol length is greater than a second threshold, the first information is sent, where the first information is used to instruct to switch the uplink transmit antenna. If the subcarrier spacing is greater than or equal to a first threshold and/or the symbol length is less than or equal to a second threshold, information may be not sent, or the first information may be sent, where the first information is used to instruct not to perform switching.

Optionally, when the length of the slot or mini slot is greater than or equal to a third threshold, the network device sends the first information, where the first information is used to instruct to switch the uplink transmit antenna. If the length of the slot or mini slot is less than a third threshold, information may be not sent, or the first information is sent to instruct not to perform switching.

Optionally, when the length of the slot or mini slot is less than a third threshold, the network device sends the first information, where the first information is used to instruct not to switch the uplink transmit antenna. If the length of the slot or mini slot is greater than or equal to a third threshold, information may be not sent, or the first information is sent to instruct to perform switching.

Optionally, when a first time length is greater than or equal to the time interval threshold, the first information is sent, where the first information is used to instruct to switch the uplink transmit antenna, and the first time length is equal to a time length before a switching time node, a time length after a switching time node or a sum of time lengths before and after a switching time node. If the first time length is less than the time interval threshold, information may be not sent, or the first information is sent to instruct to perform switching.

Optionally, when a first time length is less than the time interval threshold, the first information is sent, where the first information is used to instruct not to switch the uplink transmit antenna, and the first time length is equal to a time length before a switching time node, a time length after a switching time node or a sum of time lengths before and after a switching time node. If the first time length is greater than or equal to the time interval threshold, information may be not sent, or the first information is sent to instruct to perform switching.

Optionally, a time length before a switching time node may be a length from the switching time node to a fixed time point, or a time length from the switching time node to a starting point of a current signal transmission, or a continuous time length of a fixed transmit antenna used before the switching time node.

Optionally, a time length after a switching time node may be a length from the switching time node to a fixed time point, or a time length from the switching time node to an end point of a current signal transmission, or a continuous time length of a fixed transmit antenna used after the switching time node.

Optionally, the network device selects the time interval threshold from a time interval threshold set.

Optionally, the time interval threshold is selected from the time interval threshold set according to the basic parameter set used when the terminal uses the uplink transmit antenna to send a signal.

Specifically, the network device may select the time interval threshold from the time interval threshold according to the subcarrier spacing and/or the symbol length used when the terminal transmits an uplink signal.

Optionally, each subcarrier spacing and/or symbol length may correspond to a respective time interval threshold, and the time interval threshold may be negatively correlated to the subcarrier spacing and positively correlated to the symbol length.

Optionally, each subcarrier spacing and/or symbol length may correspond to a respective time interval threshold, and the time interval threshold may be negatively correlated to the subcarrier spacing and positively correlated to the symbol length.

Optionally, the network device receives second information sent by the terminal, where the second information is used to indicate the time interval threshold.

Specifically, the terminal may indicate, to the network device, a time interval threshold that can be supported by the terminal, and the time interval threshold may be correlated to a capability of the terminal or correlated to the basic parameter set.

Therefore, in this embodiment of this application, the network device sends first information used to instruct the terminal to switch or not to switch the uplink transmit antenna according to at least one of a time interval threshold for switching an uplink transmit antenna by a terminal, a basic parameter set used when the terminal uses the uplink transmit antenna to send a signal, or a configuration of a slot or a mini slot, it may be chosen, according to a current communication scenario, to switch or not to switch an antenna to enable an antenna switching aspect to adapt to flexible transmission of a 5G system.

Figure 5:
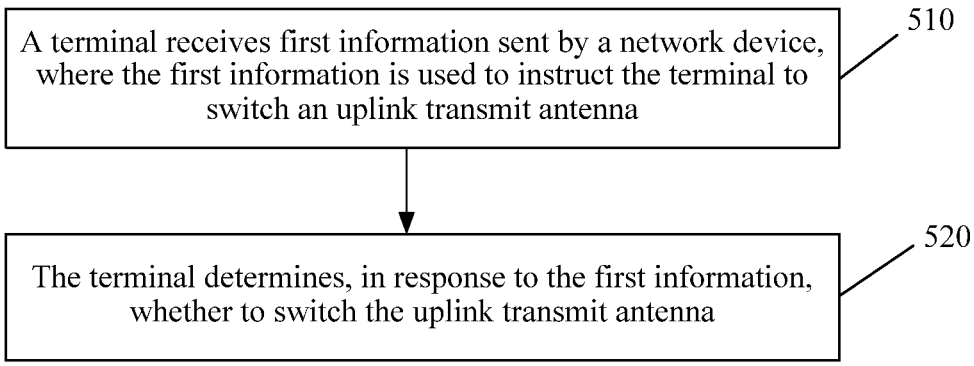
FIG. 5 is a schematic flowchart of a wireless communications method according to an embodiment of this application.

FIG. 5 is a schematic flowchart of a wireless communications method 500 according to an embodiment of this application. The method 500 includes at least some of the following content.

510. A terminal receives first information sent by a network device, where the first information is used to instruct the terminal to switch an uplink transmit antenna.

520. The terminal determines, in response to the first information, whether to switch the uplink transmit antenna.

Optionally, the terminal determines, according to at least one of a time interval threshold for switching the uplink transmit antenna, a basic parameter set used when the terminal uses the uplink transmit antenna to send a signal, or a configuration of a slot or a mini slot, whether to switch the uplink transmit antenna.

Optionally, it is determined, according to a subcarrier spacing and/or a symbol length included in the basic parameter set, whether to switch the uplink transmit antenna.

In an implementation, when the subcarrier spacing is greater than or equal to a first threshold and/or the symbol length is less than or equal to a second threshold, it is determined not to switch the uplink transmit antenna.

In an implementation, when the subcarrier spacing is less than a first threshold and/or the symbol length is greater than a second threshold, it is determined to switch the uplink transmit antenna.

Optionally, when the length of the slot or mini slot is greater than or equal to a third threshold, the network device sends the first information, and the terminal determines to switch the uplink transmit antenna.

Optionally, when the length of the slot or mini slot is less than a third threshold, the network device sends the first information, and the terminal determines not to switch the uplink transmit antenna.

Optionally, when a first time length is greater than or equal to the time interval threshold, it is determined to switch the uplink transmit antenna; or when a first time length is less than the time interval threshold, it is determined not to switch the uplink transmit antenna, where the first time length is equal to a time length before a switching time node, a time length after a switching time node or a sum of time lengths before and after a switching time node.

Optionally, the terminal sends second information to the network device, where the second information is used to indicate the time interval threshold.

It should be understood that some descriptions in the method 400, for example, the explanations of terms, the manner of determining whether the terminal needs to switch an antenna, and the like, may be applicable to the method 500. For brevity, details are not described herein again.

Therefore, in this embodiment of this application, after receiving first information that is sent by a network device and is used to instruct the terminal to switch an antenna, a terminal may determine whether to switch an uplink antenna during uplink signal transmission instead of being required to switch an antenna, so that it may be chosen, according to a current communication scenario, to switch or not to switch an antenna to enable an antenna switching aspect to adapt to flexible transmission of a 5G system.

It should be understood that in the description of the method 500, the terminal determines, after receiving information used to instruct the terminal to switch the uplink transmit antenna, whether to switch an antenna. In this embodiment of this application, the terminal may also determine, after receiving information used to instruct the terminal not to switch the uplink transmit antenna, whether to switch an antenna. For a specific determining manner, refer to the description of the method 500. For brevity, details are not described herein again.

It should further be understood that the method 400 or 500 in this embodiment of this application may be varied for use in a scenario of switching a downlink antenna. That is, the uplink signal in the methods 400 and 500 may be replaced with a downlink signal, and the uplink antenna is replaced with a downlink antenna.

Figure 6:
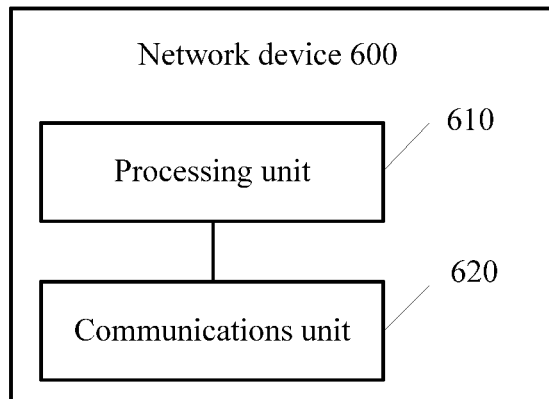
FIG. 6 is a schematic block diagram of a network device according to an embodiment of this application.

FIG. 6 is a schematic block diagram of a network device 600 according to an embodiment of this application. As shown in FIG. 6, the network device 600 includes a processing unit 610 and a communications unit 620.

Optionally, the processing unit 610 is configured to determine one of a time interval threshold for performing frequency hopping by a terminal during transmission of a first signal, a basic parameter set used by the terminal to transmit the first signal, or a configuration of a slot or a mini slot; and the communications unit 620 is configured to send first information according to at least one of the time interval threshold, the basic parameter set, or the configuration of the slot or mini slot, where the first information is used to instruct the terminal to perform or not to perform frequency hopping during transmission of the first signal.

It should be understood that the network device 600 may correspond to the network device in the method 200, and may implement the corresponding operations implemented by the network device in the method 200. For brevity, details are not described herein again.

Optionally, the processing unit 610 is configured to determine at least one of a time interval threshold for switching an uplink transmit antenna by a terminal, a basic parameter set used when the terminal uses the uplink transmit antenna to send a signal, or a configuration of a slot or a mini slot; and the communications unit 620 is configured to send first information according to at least one of the time interval threshold, the basic parameter set, or the configuration of the slot or mini slot to instruct the terminal to switch or not to switch the uplink transmit antenna.

It should be understood that the network device 600 may correspond to the network device in the method 400, and may implement the corresponding operations implemented by the network device in the method 400. For brevity, details are not described herein again.

Figure 7:
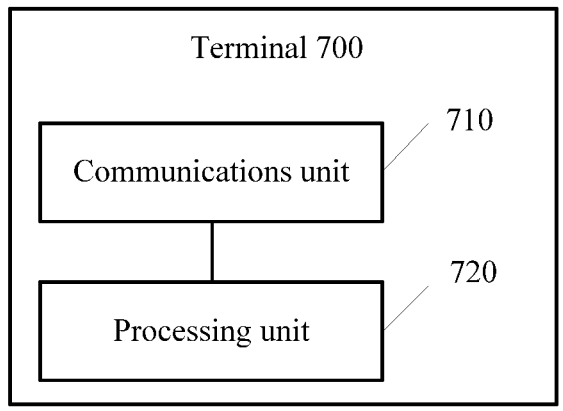
FIG. 7 is a schematic block diagram of a terminal according to an embodiment of this application.

FIG. 7 is a schematic block diagram of a terminal 700 according to an embodiment of this application. As shown in FIG. 7, the terminal 700 includes a communications unit 710 and a processing unit 720.

Optionally, the communications unit 710 is configured to receive first information sent by a network device, where the first information is used to instruct the terminal to perform frequency hopping during transmission of a first signal; and the processing unit 720 is configured to determine, in response to the first information, whether to perform frequency hopping during transmission of the first signal.

It should be understood that the terminal 700 may correspond to the terminal in the method 300, and may implement the corresponding operations implemented by the terminal in the method 300. For brevity, details are not described herein again.

Optionally, the communications unit 710 is configured to receive first information sent by a network device, where the first information is used to instruct the terminal to switch an uplink transmit antenna; and the processing unit 720 is configured to determine, in response to the first information, whether to switch the uplink transmit antenna.

It should be understood that the terminal 700 may correspond to the terminal in the method 500, and may implement the corresponding operations implemented by the terminal in the method 500. For brevity, details are not described herein again.

Figure 8:
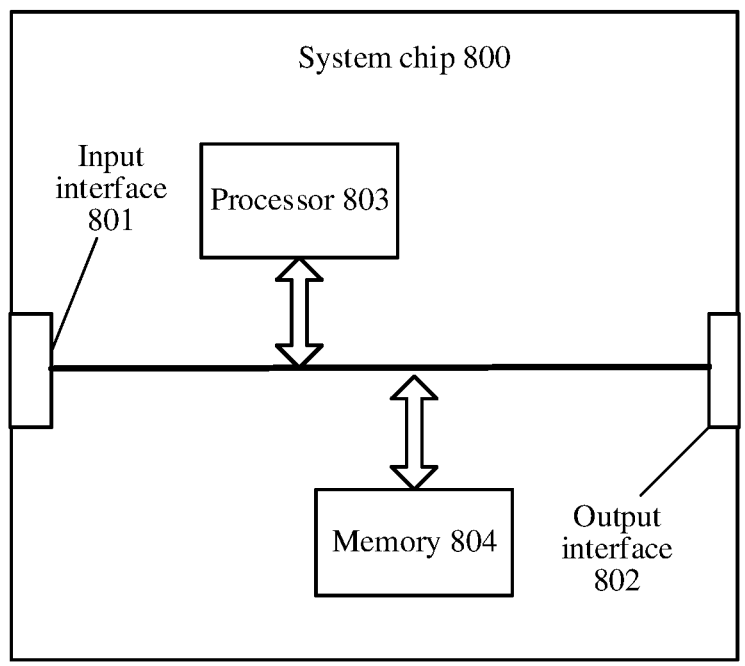
FIG. 8 is a schematic block diagram of a system chip according to an embodiment of this application.

FIG. 8 is a schematic structural diagram of a system chip 800 according to an embodiment of this application. The system chip 800 in FIG. 8 includes an input interface 801, an output interface 802, a processor 803, and a memory 804 that may be connected through an internal communication connection line, where the processor 803 is configured to execute code in the memory 804.

Optionally, when the code is executed, the processor 803 implements the method performed by the network device in the method embodiments. For brevity, details are not described herein again.

Optionally, when the code is executed, the processor 803 implements the method performed by the terminal in the method embodiments. For brevity, details are not described herein again.

Figure 9:
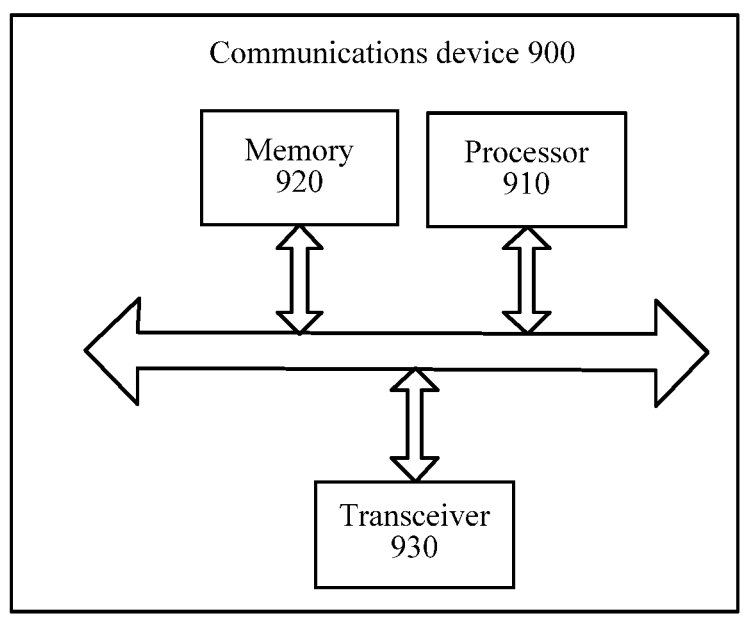
FIG. 9 is a schematic block diagram of a communications device according to an embodiment of this application.

FIG. 9 is a schematic block diagram of a communications device 900 according to an embodiment of this application. As shown in FIG. 9, the communications device 900 includes a processor 910 and a memory 920. The memory 920 may store program code, and the processor 910 may execute the program code stored in the memory 920.

Optionally, as shown in FIG. 9, the communications device 900 may include a transceiver 930, and the processor 910 may control the transceiver 930 to communicate externally.

Optionally, the processor 910 may invoke the program code stored in the memory 920 to perform the corresponding operations of the network device in the method embodiments. For brevity, details are not described herein again.

Optionally, the processor 910 may invoke the program code stored in the memory 920 to perform the corresponding operations of the terminal in the method embodiments. For brevity, details are not described herein again.

It should be understood that the processor in the embodiments of this application may be an integrated circuit chip and has a signal processing capability. During implementation, the steps in the foregoing method embodiments may be implemented by using an integrated logic circuit of hardware in the processor or an instruction in the form of software. The processor may be a general-purpose processor a digital signal processor (Digital Signal Processor DSP), an application-specific integrated circuit (Application Specific Integrated Circuit, ASIC), a field programmable gate array (Field Programmable Gate Array, FPGA) or another programmable logic device, a discrete gate or transistor logic device, and a discrete hardware component. The methods, steps, and logic block diagrams disclosed in the embodiments of this application may be implemented or performed. The general-purpose processor may be a microprocessor or the processor may be alternatively any conventional processor or the like. The steps in the methods disclosed with reference to the embodiments of this application may be directly performed or completed by a decoding processor embodied as hardware or performed or completed by using a combination of hardware and software modules in a decoding processor. The software module may be located at a random-access memory, a flash memory, a read-only memory, a programmable read-only memory or an electrically erasable programmable memory, a register or another mature storage medium in this field. The storage medium is located at a memory, and the processor reads information in the memory and completes the steps in the foregoing methods in combination with the hardware thereof.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random-access memory (Random-access memory, RAM) and is used as an external cache. For exemplary rather than limitative description, many forms of RAMs can be used, and are, for example, a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Rambus random-access memory (Direct Rambus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of this application. The foregoing storage medium includes: any medium that can store program codes, such as a USB flash disk, a removable hard disk, a read-only memory (ROM, Read-Only Memory), a random-access memory (RAM, Random-access memory), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A wireless communication method, comprising:
determining, by a network device, a time interval threshold for switching an uplink transmit antenna by a terminal, a basic parameter set used when the terminal uses the uplink transmit antenna to send a signal, and a configuration of a slot or a mini slot; and
sending, by the terminal device, first information according to the time interval threshold, the basic parameter set, and the configuration of the slot or mini slot to instruct the terminal to switch or not to switch the uplink transmit antenna.

2. The method according to claim 1, wherein the sending, by the network device, first information according to the time interval threshold, the basic parameter set, and the configuration of the slot or mini slot to instruct the terminal to switch or not to switch the uplink transmit antenna comprises:
sending the first information according to a subcarrier spacing and/or a symbol length comprised in the basic parameter set.

3. The method according to claim 1, wherein the sending, by the network device, first information according to the time interval threshold, the basic parameter set, and the configuration of the slot or mini slot to instruct the terminal to switch or not to switch the uplink transmit antenna comprises:
when the length of the slot or mini slot is greater than or equal to a third threshold, sending, by the network device, the first information, the first information is used to instruct to switch the uplink transmit antenna.

4. The method according to claim 1, wherein the sending, by the network device, first information according to the time interval threshold, the basic parameter set, and the configuration of the slot or mini slot to instruct the terminal to switch or not to switch the uplink transmit antenna comprises:
when the length of the slot or mini slot is less than a third threshold, sending, by the network device, the first information, wherein the first information is used to instruct not to switch the uplink transmit antenna.

5. The method according to claim 1, wherein the determining, by the network device, the time interval threshold for switching the uplink transmit antenna by the terminal comprises:
selecting, by the network device, the time interval threshold from a time interval threshold set.

6. The method according to claim 5, wherein the selecting, by the network device, the time interval threshold from the time interval threshold set comprises:
selecting the time interval threshold from the time interval threshold set according to the basic parameter set used when the terminal uses the uplink transmit antenna to send a signal.

7. A wireless communications method, comprising:
receiving, by a terminal, first information sent by a network device, wherein the first information is used to instruct the terminal to switch an uplink transmit antenna, and the first information is determined based on a time interval threshold for switching an uplink transmit antenna by a terminal, a basic parameter set used when the terminal uses the uplink transmit antenna to send a signal, and a configuration of a slot or a mini slot; and
determining, by the terminal in response to the first information, whether to switch the uplink transmit antenna.

8. The method according to claim 7, further comprises:
determining, according to a subcarrier spacing and/or a symbol length comprised in the basic parameter set, whether to switch the uplink transmit antenna.

9. The method according to claim 7, further comprises:
when a first time length is greater than or equal to the time interval threshold, determining to switch the uplink transmit antenna; or
when a first time length is less than the time interval threshold, determining not to switch the uplink transmit antenna, wherein the first time length is equal to a time length before a switching time node, a time length after a switching time node or a sum of time lengths before and after a switching time node.

10. A network device, comprising a processing unit and a communication unit, wherein:
the processing unit is configured to determine a time interval threshold for performing frequency hopping by a terminal during transmission of a first signal, a basic parameter set used by the terminal to transmit first signal, and a configuration of a slot or a mini slot; and
the communication unit is configured to send first information according to the time interval threshold, the basic parameter set, and the configuration of the slot or mini slot, wherein the first information is used to instruct the terminal to perform or not to perform frequency hopping during transmission of the first signal.

11. The device according to claim 10, wherein the communications unit is further configured to:
send the first information according to a subcarrier spacing and/or a symbol length comprised in the basic parameter set.

12. The device according to claim 10, wherein the communications unit is further configured to:
when the length of the slot or mini slot is greater than or equal to a third threshold, send the first information, wherein the first information is used to instruct to perform frequency hopping.

13. The device according to claim 10, wherein the communications unit is further configured to:
when the length of the slot or mini slot is less than a third threshold, send the first information, wherein the first information is used to instruct not to perform frequency hopping.

14. The device according to claim 10, wherein the processing unit is further configured to:
select the time interval threshold from a time interval threshold set.

15. The device according to claim 14, wherein the processing unit is further configured to:
select the time interval threshold from the time interval threshold set according to the basic parameter set used by the terminal to transmit the first signal.

16. A network device, comprising a processing unit and a communication unit, wherein:
the processing unit is configured to determine a time interval threshold for switching an uplink transmit antenna by a terminal, a basic parameter set used when the terminal uses the uplink transmit antenna to send a signal, and a configuration of a slot or a mini slot; and
the communication unit is configured to send first information according to the time interval threshold, the basic parameter set, and the configuration of the slot or mini slot to instruct the terminal to switch or not to switch the uplink transmit antenna.

17. The device according to claim 16, wherein the communications unit is further configured to:
send the first information according to a subcarrier spacing and/or a symbol length comprised in the basic parameter set.

18. The device according to claim 16, wherein the communications unit is further configured to:
when the length of the slot or mini slot is greater than or equal to a third threshold, send the first information, wherein the first information is used to instruct to switch the uplink transmit antenna.

19. The device according to claim 16, wherein the communications unit is further configured to:

when the length of the slot or mini slot is less than a third threshold, send the first information, wherein the first information is used to instruct not to switch the uplink transmit antenna.

* * * * *